Figure 1:
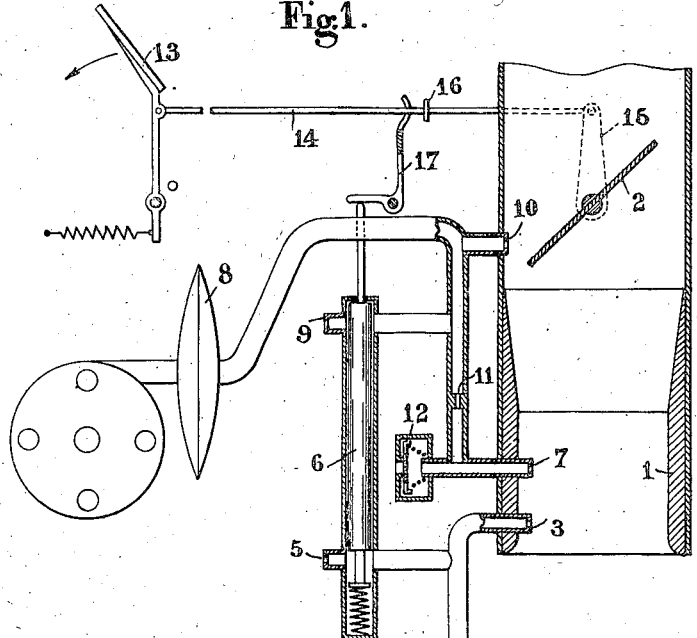

March 4, 1958     A. BRUEDER     2,825,320
SPARK-IGNITION ENGINES
Filed April 17, 1956

United States Patent Office 2,825,320
Patented Mar. 4, 1958

2,825,320

SPARK-IGNITION ENGINES

Antoine Brueder, Paris, France, assignor to Societe Anonyme Andre Citroen, Paris, France Application April 17, 1956, Serial No. 578,700

Claims priority, application France March 15, 1956

5 Claims. (Cl. 123—117)

This invention relates to internal-combustion engines and more particularly to spark-ignition engines, and its essential object is to improve the efficiency of engines of this type, especially those designed for operation with relatively lean air-fuel mixtures.

Maximum economy is obtained by running the engine with extremely lean mixtures, i. e. with an excess of the air constituent which may attain 20%; this is achieved notably by injecting the fuel instead of mixing it homogenously with the combustion air; when it is desired to obtain the maximum engine power it is necessary to enrich the mixture by increasing its fuel constituent; thus, the engine may be normally adjusted for economical operation by running with a lean mixture (decrease in fuel content) while permitting an increase in the richness of the mixture when it is desired to produce the maximum energy liberation or the maximum engine output.

In view of the foregoing it is the object of this invention to enable an engine of the general type indicated hereinabove to be run at will either under maximum fuel economy conditions or under maximum power conditions, this object being attained by varying automatically the ignition timing as a function of the mixture richness, as very lean mixtures tolerate a greater ignition advance than rich mixtures; thus, the engine efficiency is increased.

This result is attained in the improved spark-ignition engine of this invention by equipping same with a device adapted to cause the simultaneous variation of both the mixture richness and the ignition timing, this engine comprising of course the conventional automatic timing control device operated by variations in the engine speed and load, associated or not with a hand-lever timing control.

If the engine constitutes the power-unit of an automotive vehicle it may comprise a device so constructed that when the accelerator pedal is fully depressed the mixture-enriching mechanism retards automatically the ignition timing.

Figure 2:
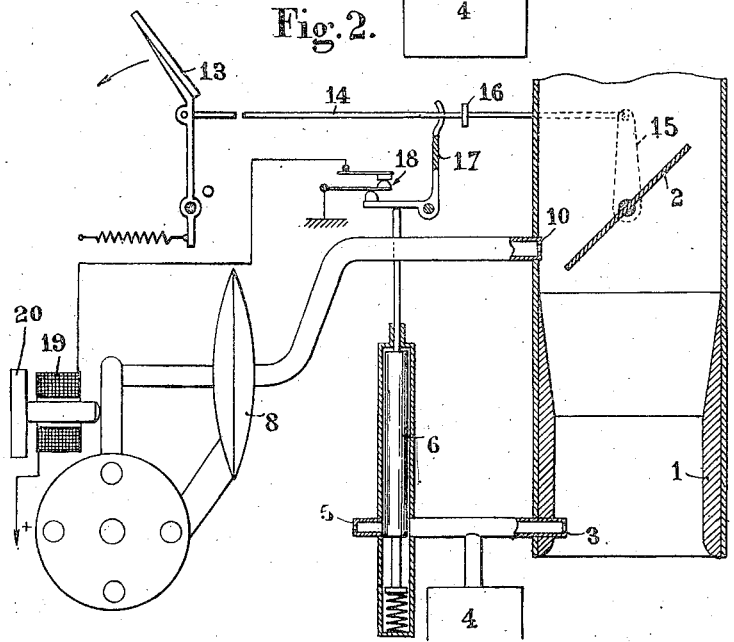

In order to afford a clearer understanding of the invention and of the manner in which the same may be carried out in the practice, reference will now be had to the attached drawings forming part of this specification and illustrating diagrammatically by way of example two typical embodiments thereof. In the drawings:

Figure 1 is a diagrammatical, part-sectional view showing a first embodiment, and Figure 2 is a similar view showing another embodiment.

The air inspired by the engine suction passes through a choke tube or Venturi 1 and the power output is regulated by means of a throttle valve 2.

A gaged suction intake 3 is fitted in the throat portion of the choke tube and the relevant vacuum is applied to the device 4 for regulating the fuel flow; this fuel flow is substantially proportional to the air flow and therefore to the square root of the vacuum available at the Venturi throat. A small piston 6 is used for simultaneously correcting the mixture richness and the ignition timing. In the position shown in Fig. 1 a gaged orifice 5 is uncovered by the piston 6 and air is admitted therethrough, thereby reducing the vacuum acting on the apparatus 4. Since the higher the suction or vacuum, the greater the fuel flow, this reduced vacuum gives a lean mixture. Another gaged orifice 7 is connected to the throat portion of the Venturi and transmits the vacuum thereof to the diaphragm 8 controlling an ignition distributor according to the known system. In the operative position shown in this figure the orifice 9 is occluded by the piston 6 and therefore the vacuum is applied directly to the diaphragm. Another gaged orifice 10 located in the region of the throttle valve 2 according to the conventional practice applies the varying suction to the diaphragm to automatically control the ignition timing as the suction increases in the throttle-valve region. When the throttle valve 2 is almost wide open the whole suction available is derived from the intake 7; on the other hand, when the throttle valve is almost closed the vacuum is controlled through the intake 10. A spring-loaded valve 12 prevents the ignition advance given by the intake 7 from becoming excessive at high engine R. P. M.'s. An orifice 11 attenuates the action of the valve 12 to prevent the latter from reducing the ignition advance at low throttle opening. In the position illustrated in Fig. 1 a lean-mixture operation is obtained; the piston 6 on the one hand reduces through a leak the suction by which the fuel flow is regulated, and on the other hand applies to the diaphragm controlling the ignition timing either the suction from the intake 7 or the suction from the intake 10 giving an ignition advance even under wide-open throttle conditions.

It will now be assumed that the accelerator pedal 13 is depressed to the maximum (i. e. in the direction of the arrow). This movement is transmitted through the rod 14 and arm 15 to the throttle valve 2 and the latter is thus fully open. The rod 14 has rigidly secured thereon a driving member 16 adapted to actuate the bell-crank lever 17; thus, when the accelerator pedal 13 is fully depressed the bell-crank lever 17 actuates the piston 6 which occludes the orifice 5 and uncovers the orifice 9. By closing the orifice 5 the full vacuum from the Venturi is applied to the fuel-metering device 4, thereby increasing the richness of the air-fuel mixture. At the same time the orifice 9 is uncovered, thus reducing to zero the vacuum applied to the diaphragm and retarding the ignition timing.

The modified embodiment illustrated in Fig. 2 comprises again the choke tube or Venturi 1, the throttle valve 2 and the bell-crank lever 17 actuating the piston 6 when the accelerator pedal 13 is depressed home. In this arrangement the only function of the piston 6 is to correct the richness of the fuel mixture. The bell-crank lever 17 actuates at the same time an electric contact 18 to earth an electromagnet 19, thereby energizing same. The movable member of this electromagnet is operatively connected to the ignition distributor coupled on the other hand to a conventional automatic vacuum timing control, i. e. a diaphragm 8 connected through a pipe line to the suction intake 10 located in the throttle region of the induction manifold. As long as the accelerator pedal is not fully depressed the air-fuel mixture remains lean and the contact 18 remains closed; thus, the electromagnet 19 attracts the plunger armature 20 to keep a certain amount of ignition advance even if the vacuum acting on the diaphragm 8 is relatively moderate. When the accelerator pedal 13 is fully depressed the bell-crank lever 17 actuates the piston 6 and the latter causes the enrichment of the air-fuel mixture as the contact 18 is opened; thus, the ignition is retarded.

Of course, the embodiments of the invention which have been described hereinabove with reference to the attached drawings should not be construed as limiting the purpose of the invention as many modifications may be brought thereto without departing from the spirit and scope of the invention. Thus, notably, the arrangement may be such as to correct the centrifugal ignition timing as a function of the mixture richness so as to obtain a different centrifugal ignition timing according as the device is in a rich-mixture or lean-mixture operating condition; again, the ignition timing may be adjusted through mechanical, hydraulic or pneumatic means.

What I claim is:

1. In an internal combustion engine having an intake passageway, a throttle valve in the intake passageway controlling the flow of air therethrough, an ignition timer, a first pressure-responsive device for actuating the timer between advance and retard spark positions, a second pressure-responsive device for metering the fuel to the engine, throttle-operated mixture control means for normally maintaining a substantially lean mixture at throttle valve positions other than full open, means cooperating with said first pressure-responsive device for maintaining the spark timer in a suitable position corresponding to the lean mixture, and throttle-operated means for simultaneously actuating the spark timer to a spark retarding position and enriching the fuel mixture when the throttle valve is fully opened to operate the engine at full power.

2. In an internal combustion engine according to claim 1, in which said throttle-operated means for simultaneously actuating the spark timer to a spark retarding position when the throttle valve is fully opened includes an electromagnet.

3. In an internal combustion engine having an intake passageway, a throttle valve in the intake passageway controlling the flow of air therethrough, an ignition timer, a first pressure responsive device for actuating the ignition timer between advance and retard spark positions, fuel injection means, a second pressure-responsive device for metering the fuel to said injection means, first conduit means provided with a first orifice in said passageway and connecting the first orifice and the metering device for selectively maintaining the fuel mixture substantially as a function of the pressure in said passageway, second conduit means provided with a second and a third orifice communicating with said passageway and connected to the first pressure-responsive means, and throttle-operated mixture control means cooperating with said first and second conduit means for normally maintaining a substantially lean mixture at throttle valve positions other than full open and including means for maintaining the spark timer in a suitable position corresponding to the lean mixture, said mixture control means being adapted for simultaneously retarding the spark and enriching the mixture when the throttle valve is fully opened to operate the engine at full power.

4. In an internal combustion engine according to claim 3, in which said mixture control means is provided with a fourth orifice communicating with the atmosphere and the first conduit means, and including a throttle-actuated piston normally biased to allow said fourth orifice to communicate with the atmosphere when the throttle valve is in other than a fully open position, said piston being adapted to isolate the first conduit means from atmosphere when the throttle valve is actuated to a fully open position, whereby the second pressure-responsive fuel metering means meters the fuel solely as a function of the pressure in said passageway.

5. In an internal combustion engine according to claim 4, in which said mixture control means is provided with a fifth orirfice communicating with the atmosphere and the second conduit means and said piston normally isolates the fifth orifice from the second conduit means when the throttle valve is in other than a fully open position said piston being adapted to allow communication between the fifth orifice means and the second conduit means when the throttle valve is actuated to a fully open position whereby the spark is retarded when the fuel mixture is enriched.

References Cited in the file of this patent

UNITED STATES PATENTS

| | | |
|---|---|---|
| 2,217,364 | Halford et al. | Oct. 8, 1940 |
| 2,460,383 | Hahn | Feb. 1, 1949 |
| 2,473,805 | Mallory | June 21, 1949 |
| 2,646,781 | Doyen | July 28, 1953 |
| 2,671,437 | Winkler | Mar. 9, 1954 |